US010245683B2

(12) United States Patent
Kramer et al.

(10) Patent No.: US 10,245,683 B2
(45) Date of Patent: Apr. 2, 2019

(54) APPARATUS AND METHOD FOR BEAM DIAGNOSIS ON LASER PROCESSING OPTICS

(71) Applicant: PRIMES GMBH MESSTECHNIK FUER DIE PRODUKTION MIT LASERSTRAHLUNG, Pfungstaddt (DE)

(72) Inventors: Reinhard Kramer, Pfungstadt (DE); Otto Maerten, Dreieich (DE); Stefan Wolf, Gross-Gerau (DE)

(73) Assignee: Primes GmbH Messtechnik fuer die Produktion mit Laserstrahlung, Pfungstadt (DE)

( * ) Notice: Subject to any disclaimer, the term of this patent is extended or adjusted under 35 U.S.C. 154(b) by 23 days.

(21) Appl. No.: 15/546,067

(22) PCT Filed: Feb. 3, 2016

(86) PCT No.: PCT/DE2016/000036
§ 371 (c)(1),
(2) Date: Jul. 25, 2017

(87) PCT Pub. No.: WO2016/124169
PCT Pub. Date: Aug. 11, 2016

(65) Prior Publication Data
US 2018/0029164 A1 Feb. 1, 2018

(30) Foreign Application Priority Data
Feb. 6, 2015 (DE) .......................... 10 2015 001 421

(51) Int. Cl.
*G01J 1/04* (2006.01)
*G01J 1/42* (2006.01)
(Continued)

(52) U.S. Cl.
CPC ............ *B23K 26/705* (2015.10); *B23K 26/04* (2013.01); *B23K 26/046* (2013.01);
(Continued)

(58) Field of Classification Search
CPC .... B23K 26/705; B23K 26/082; B23K 26/04; B23K 26/046; G01J 1/0411; G01J 1/0414; G01J 1/0448; G01J 1/4257; G01J 9/00
See application file for complete search history.

(56) References Cited

U.S. PATENT DOCUMENTS 5,078,491 A  1/1992 Johnston, Jr.
5,841,125 A * 11/1998 Livingston ............. B23K 26/04
                                                        250/201.9
(Continued)

FOREIGN PATENT DOCUMENTS

DE   196 30 607   10/1997
DE   199 09 595    9/2000
(Continued)

*Primary Examiner* — Dominic J Bologna
(74) *Attorney, Agent, or Firm* — Collard & Roe, P.C.

(57) ABSTRACT

Apparatus for determining geometrical parameters of a laser beam includes an optical system, a device for output coupling radiation, a beam diagnostic device, and a reflector element. The optical system focuses the laser beam into a processing region. The device for output coupling radiation couples out radiation that runs through the optical system in a direction opposite to a direction of the laser beam. The reflector element has a first surface which is partially reflecting and curved, where the curvature is equal to a mean curvature of a wave front of the laser beam in a positioning region of the reflector element.

17 Claims, 11 Drawing Sheets

Figure 1:
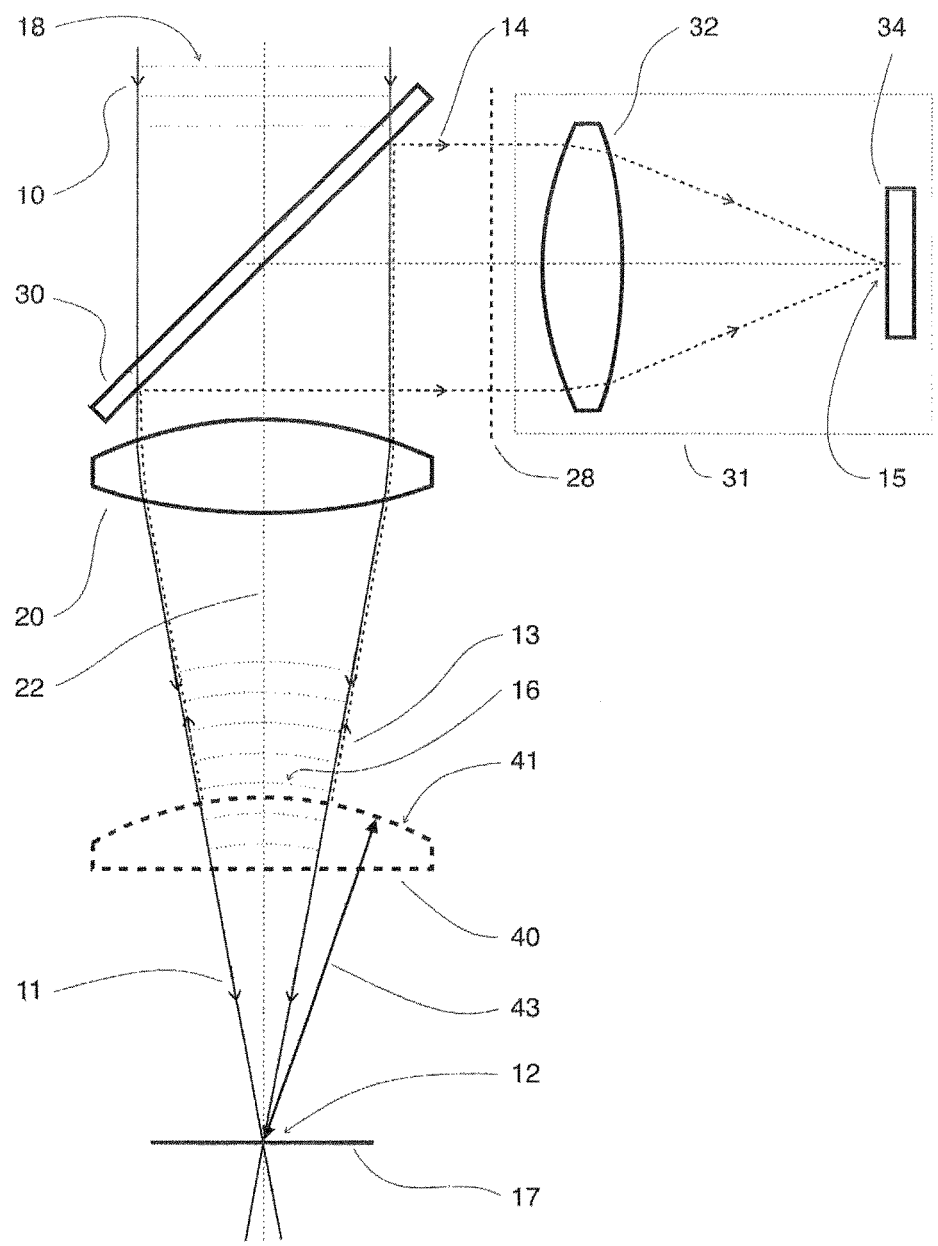

(51) Int. Cl.
*G01J 9/00* (2006.01)
*B23K 26/04* (2014.01)
*B23K 26/70* (2014.01)
*B23K 26/046* (2014.01)
*B23K 26/082* (2014.01)

(52) U.S. Cl.
CPC ........... *B23K 26/082* (2015.10); *G01J 1/0411* (2013.01); *G01J 1/0414* (2013.01); *G01J 1/0448* (2013.01); *G01J 1/4257* (2013.01); *G01J 9/00* (2013.01)

(56) References Cited

U.S. PATENT DOCUMENTS

| | | | | |
|---|---|---|---|---|
| 6,501,061 | B1* | 12/2002 | Kitai | B23K 26/04 250/201.1 |
| 8,299,433 | B2* | 10/2012 | Majewski | G01N 21/031 250/336.1 |
| 2013/0341309 | A1* | 12/2013 | Yamamoto | B23K 26/046 219/121.61 |
| 2014/0027421 | A1 | 1/2014 | Notheis | |
| 2014/0042133 | A1* | 2/2014 | Weick | B23K 26/032 219/121.81 |
| 2016/0167166 | A1* | 6/2016 | Nagano | B23K 26/046 219/121.78 |
| 2017/0115449 | A1* | 4/2017 | Nagano | G02B 5/18 |

FOREIGN PATENT DOCUMENTS

| | | |
|---|---|---|
| DE | 102005038587 | 2/2007 |
| DE | 10 2007 053 632 | 5/2009 |
| DE | 10 2011 007 176 | 10/2012 |
| DE | 20 2012 102 794 | 10/2012 |
| DE | 102011006553 | 10/2012 |
| DE | 10 2011 054 941 | 1/2013 |
| DE | 102013008774 | 9/2014 |
| EP | 0 461 730 | 12/1991 |
| JP | S 62-24117 | 2/1987 |
| JP | 1-107990 | 4/1989 |
| JP | 2008-264789 | 11/2008 |
| WO | WO 98/50196 | 11/1998 |

* cited by examiner

APPARATUS AND METHOD FOR BEAM DIAGNOSIS ON LASER PROCESSING OPTICS

CROSS-REFERENCE TO A RELATED APPLICATION

The invention described and claimed hereinbelow is a National Stage Application of PCT/EP2015/081363, filed on Dec. 29, 2015 (the PCT application), now filed in the United States under 35 USC § 371. The PCT application claims priority from German Patent Application DE 10 2015 100 524.7, filed on Jan. 14, 2015. The contents of the PCT application and the German Patent Application are incorporated by reference herein. The PCT application provides the basis for a claim for priority of invention.

FIELD OF THE INVENTION

The invention relates to an apparatus and a method for beam diagnosis of optical systems for laser material processing. The apparatus and the method are adapted for determining geometric parameters of a laser beam in the working region of a laser processing machine, such as, for example, the focus diameter. The determination of a beam profile or the measurement of the intensity distribution of the laser beam is also provided. The apparatus and the method are also suitable for determination of a correct focus position or a focus position deviating from the target position. The apparatus and the method are also designed for beam diagnostics on optical systems for remote laser material processing, in which the focus position can be freely positioned and moved within a working region by means of a scanning device.

BACKGROUND OF THE INVENTION

In order to achieve a high process quality in laser material processing systems, compliance with the process- and laser parameters within narrow limits is necessary. The process windows are very small, especially in highly dynamic processing systems. In order to ensure the processing quality, a regular and accurate monitoring of the parameters of the laser beam is therefore necessary. This is particularly true for systems in which the laser beam can be freely positioned and moved by means of a scanning device in an at least two-dimensional working region, for example by deflecting the beam over movable mirrors and subsequent scanner optics. Such remote laser processing equipment has a variety of applications, such as labeling, welding, cutting, and the like. A relatively new application is Selective Laser Melting (SLM). In this method, complex three-dimensional objects can be produced by local melting or sintering of successive thin layers of a powdered material. Since the production time of the articles in such a process is naturally long, a shortening of the production time is desirable. For this purpose, the laser beam must be moved faster, for which purpose higher laser powers are required in order to melt the powder in a shorter time. In SLM systems, therefore, laser beams with a very small focus and relatively high power are used, i.e. radiation sources with high brilliance.

Many different methods are known for determining geometric parameters of a laser beam. A principal possibility for measurement is, for example, to direct the beam directly or indirectly to a spatially resolving sensor, for example to a CCD camera, and in this way to determine the intensity distribution in the cross-section of the beam. From this data, further information such as the beam diameter or the position of the beam can also be derived or calculated. In principle, the problem of attenuating the laser beam before the beam strikes the sensor without changing the beam in its properties must be solved here.

Publications JP01107990A and JP2008264789A, for example, disclose apparatus with spatially resolving sensors, which are designed for the geometrical calibration of remote systems. In these apparatus, the light scattered by a substrate arranged in the working field is imaged onto a camera by means of a lens. From this, the position of the beam in the working field can be determined and compared with the target position. However, such apparatus are not suitable for measuring the focus diameter or the intensity distribution in the focus of the laser beam because of the achievable spatial resolution.

Apparatus from the available technology are also known in which a spatially resolving sensor is arranged in a beam path, which is coupled out by means of a beam splitter before the focusing of the laser beam. A beam component reflected back into the focusing of the laser beam is then used for the beam diagnosis. The reflection of the beam takes place, for example, on a boundary surface of the imaging optical system, typically on the last boundary surface of the focusing lens, or on a downstream protective glass. A general method of this type is disclosed in DE102007053632. An apparatus of a similar type, which is also designed for use in scanner optics, is shown in DE102011054941. A disadvantage of the apparatus known from the available technology is that the back-image by the focusing lens is partially loaded with considerable imaging errors, since the back-reflected beam basically has different dimensions and waist positions and the correction of the focusing lens is not simultaneously designed for the imaging of reflections with different dimensions and waist positions. This disadvantageous effect is reinforced even more through protective glass designed as concave mirror for back reflection, which is proposed in DE102011054941. The known systems are therefore not suitable for precise beam diagnosis. At best, with the known systems, relative changes in the focusing lens can be recognized by a measurement in new condition and a target/actual comparison.

Another basic possibility for beam diagnosis is to sample the beam. Many variants are known for this purpose. Sampling can take place with a near-point-shaped probe, for example a measuring aperture or a measuring needle whose opening is small compared to the beam diameter. In this case, the beam must be scanned in several passes with marginally offset lines. In this way, the two-dimensional intensity distribution of the beam can be determined.

However, a sampling can also take place with a line probe, for example with a slot or with a slot aperture. In the case of linear sampling, the beam intensity is already integrated in one direction. The advantage is that the beam diameter can be determined with a single scanning pass.

A relative movement between beam and sampling probe is necessary for sampling. In the case of a stationary beam the probe must be necessarily moved. Numerous apparatus, which are not specifically intended for use in remote systems, are known for this measuring principle. Apparatus with quasi-punctiform sampling systems are known, for example, from DE19909595 and EP0461730. Publications U.S. Pat. No. 5,078,491 and JP62024117A disclose, for example, apparatus with linear sampling systems. A further apparatus with essentially linear sampling is known from WO89/50196, in which, for example, an optical fiber is proposed for sampling the beam.

In sampling systems, the achievable resolution is always limited by the size of the sampling aperture. In order to determine the desired parameter, for example the beam diameter or the beam profile, a computational expansion with the sampling function is also required. Therefore, complex operations and calculations must be carried out in order to obtain the desired parameters. A further disadvantage is that sampling takes a long time and complicated apparatus are required for the precise control and movement of the sampling probe.

In the case of apparatus for beam diagnosis in remote laser processing systems, however, there is the specific feature that the laser beam can be deflected in two dimensions by means of a scanning device so that the beam can be freely positioned in a two-dimensional or sometimes three-dimensional working space. In this case, it is also possible that the sampling probe is stationary and the beam is moved by means of the scanning device via the sampling probe.

According to the latter principle, for example the method disclosed in DE2005038587 works. There, a measuring system is proposed in which a laser beam can be moved by means of a deflection system in a specifiable pattern via a detector arrangement. A similar method according to this principle is shown in DE102011006553. A method for determining the focus position or the beam profile of a laser beam by means of a scanning system is specified there, in which a pinhole aperture with a subsequent detector is arranged at several measuring points in the working space of the laser beam. At each of the measuring points for an x-y-focus position or beam profile measurement, the laser beam is moved by means of the scanner optics to an x-y grid over the measuring hole of the pinhole aperture.

Another similar apparatus of the aforementioned type is disclosed in U.S. Pat. No. 6,501,061. The laser beam is scanned via an aperture and the scanner can be position-calibrated by comparing the scanner position data at the time of the laser beam detection.

The apparatus known from the available technology, which use scanning optics for sampling, have the following disadvantages: On one hand the beam data can usually only be recorded at individual positions, on the other hand the attainable spatial resolution is directly related to the precision with which the laser beam can be moved or positioned by means of the scanner optics. The precise measurement of the beam profile of a finely-focused laser beam of a low-order mode is generally not possible in this way.

A fundamental problem with the measurement of laser radiation is furthermore the high power density in the beam, which can quickly lead to the destruction of the sensors used. Semiconductor sensors, such as photodiodes or CCD cameras, are particularly sensitive in this respect, which is why the laser beam must first be attenuated by many orders of magnitude. However, the elements used for attenuation often change the beam such that it is problematic to recalculate to the exact beam parameters of the original beam. Optical elements can cause thermally induced changes in the image due to low absorption of laser radiation. If such effects are to be detected in the laser processing optics by means of a beam diagnostic apparatus, then it is disadvantageous, if attenuating elements increase this effect. On the other hand, the scanning systems can have an advantage since the beam is moved relative to the scanner and therefore the action takes place only briefly. However, many passes are usually required for scanning, so that an action often occurs one behind the other. In addition, current high-brilliancy laser sources have such high power densities in the beam that it is also generally necessary for scanning systems to direct only a fraction of the beam intensity to the respectively used sensor.

The apparatus and methods known from the available technology therefore have considerable disadvantages, both with regard to the attainable accuracy and spatial resolution as well as with respect to the compatibility with laser beams of high power.

OBJECTS AND SUMMARY OF THE INVENTION

The invention is therefore based on the task of providing a method and an apparatus for beam diagnosis of optical systems for laser material processing which are suitable for the measurement of laser radiation with very high power and an accurate determination of at least one geometric beam parameter, for example of the focus diameter, and which can also be used in an extended operating range of the laser beam.

In order to achieve the object, an apparatus for determining geometrical parameters of a laser beam is proposed which includes an optical system, a device for output coupling radiation, a beam diagnostic device, and a reflector element. The optical system is configured to focus a laser beam into a processing region. The device for output coupling radiation is configured to couple out radiation which runs through the optical system in a direction opposite to the laser beam. The reflector element has a first surface which is partially reflecting and curved. The reflector element is placeable in a positioning region between the optical system and the processing region. The curvature of the first surface of the reflector element is equal to a mean curvature of a wave front of the laser beam in the positioning region of the reflector element, the laser beam being focused by the optical system.

An apparatus is provided in which the first surface of the reflector element is set concentric to the wavefront of the focused laser beam.

The center of curvature of the first surface of the reflector element can be adjusted to a desired position of the laser beam focus of the focused laser beam.

An apparatus is provided which further includes a positioning apparatus. The reflector element is coupled to the positioning apparatus. The positioning apparatus is adapted to position the reflector element at various positions in a positioning region between the optical system and the processing region.

The positioning apparatus can be configured to position the reflector element at different distances from the optical axis of the optical system.

The positioning apparatus can also be configured to align and position the reflector element at different angles to the optical axis of the optical system.

An apparatus is also provided which, in addition to the reflector element, includes further reflector elements each having a first surface. The first surface of the reflector element and the first surfaces of the further reflector elements have the same curvature. The reflector element and the further reflector elements are arranged at various positions in a planar region parallel to the processing region between the optical system and the processing region.

The optical system for focusing the laser beam can be part of scanner optics in a remote laser material processing system.

An embodiment of the invention is provided for in which the beam diagnostic device includes a device for focusing the output coupled radiation and a spatially resolving sensor.

The device for focusing can comprise a lens array in one embodiment of the apparatus.

The beam diagnostic device may further include an image distance adjustment device configured to change an axial distance between the spatially resolving sensor and a position of an image of the laser beam focus.

An apparatus is provided in which the device for image distance adjustment includes a device for axially displacing the device for focusing the output coupled radiation.

An apparatus is also provided in which the device for image distance adjustment comprises a focusing lens with adjustable focal length.

In the case of the apparatus as per the invention, the determination of geometric parameters of a laser beam can comprise the determination of at least one of the following variables: Diameter of a laser beam, focus diameter of a laser beam, lateral position of a laser beam in a processing region, axial focus position, intensity distribution of a laser beam, beam profile of a laser beam, wave front of a laser beam, laser beam path velocity, seam energy of a processing track.

A method for determining geometric parameters of a laser beam, which comprises the following method steps, is also provided for solving the problem. A laser beam is focused by means of an optical system into a processing region. A reflector element with a first surface is positioned in a positioning region between the optical system and the processing region. The first surface of the reflector element is curved and the reflector element is positioned in a positioning region in which a mean curvature of the wave front of the laser beam focused by the optical system is equal to the curvature of the first surface of the reflector element. A portion of the focused laser beam is reflected back on the first surface of the reflector element in the direction of the optical system. A portion of the back-reflected beam portion is output coupled. A geometrical parameter is determined from the output coupled beam component by means of a beam diagnostic device.

The first surface of the reflector element can be adjusted concentrically to the wave front of the focused laser beam.

A method is also provided in which the center of curvature of the first surface of the reflector element is set to a target position of the laser beam focus of the focused laser beam.

In an embodiment of the method, the determination of at least one geometric parameter by means of the beam diagnostic device comprises the following method steps. At least one sub-region of the output coupled beam component is focused on a spatially resolving sensor. The intensity data supplied by the spatially resolving sensor is recorded. From the recorded intensity data of the spatially resolving sensor, at least one geometric parameter is determined.

In a further embodiment of the method, an axial distance between the spatially resolving sensor and a position of an image of the laser beam focus is varied.

A method is also proposed in which the determination of geometric parameters of a laser beam comprises determining at least one of the following variables: Diameter of a laser beam, focus diameter of a laser beam, lateral position of a laser beam in a processing region, axial focus position, intensity distribution of a laser beam, beam profile of a laser beam, wave front of a laser beam, laser beam path velocity, seam energy of a processing track.

BRIEF DESCRIPTION OF THE DRAWING FIGURES

The invention is illustrated in more detail using the following figures, without being limited to the shown embodiments. It shows:

FIG. 1: A schematic representation of a first embodiment of the invention with a low-reflecting beam splitter as a device for coupling out the back-reflected beam component.

Figure 2:
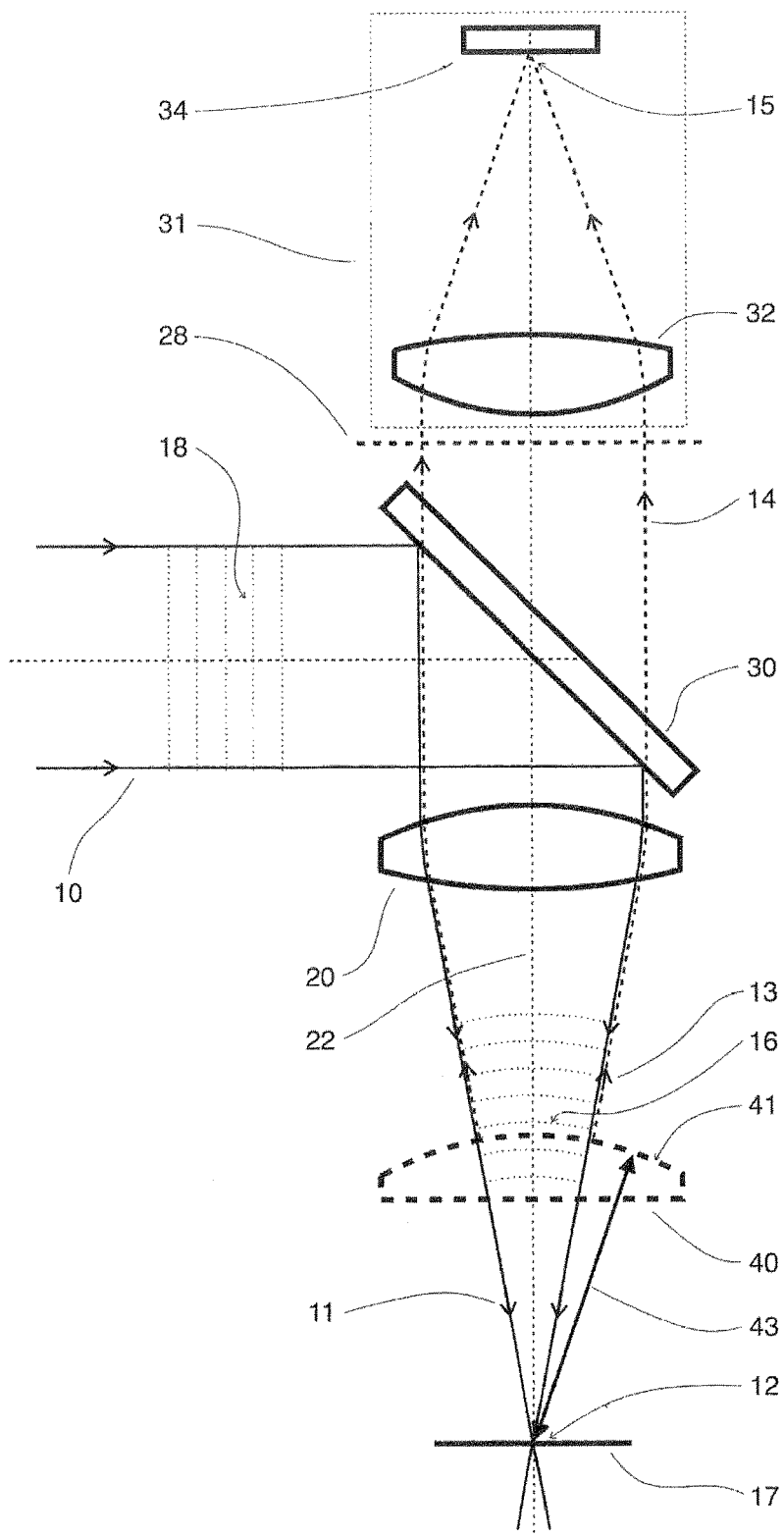

FIG. 2: A schematic representation of a second embodiment of the invention with a high-reflecting mirror as a device for coupling out the back-reflected beam component.

Figure 3:
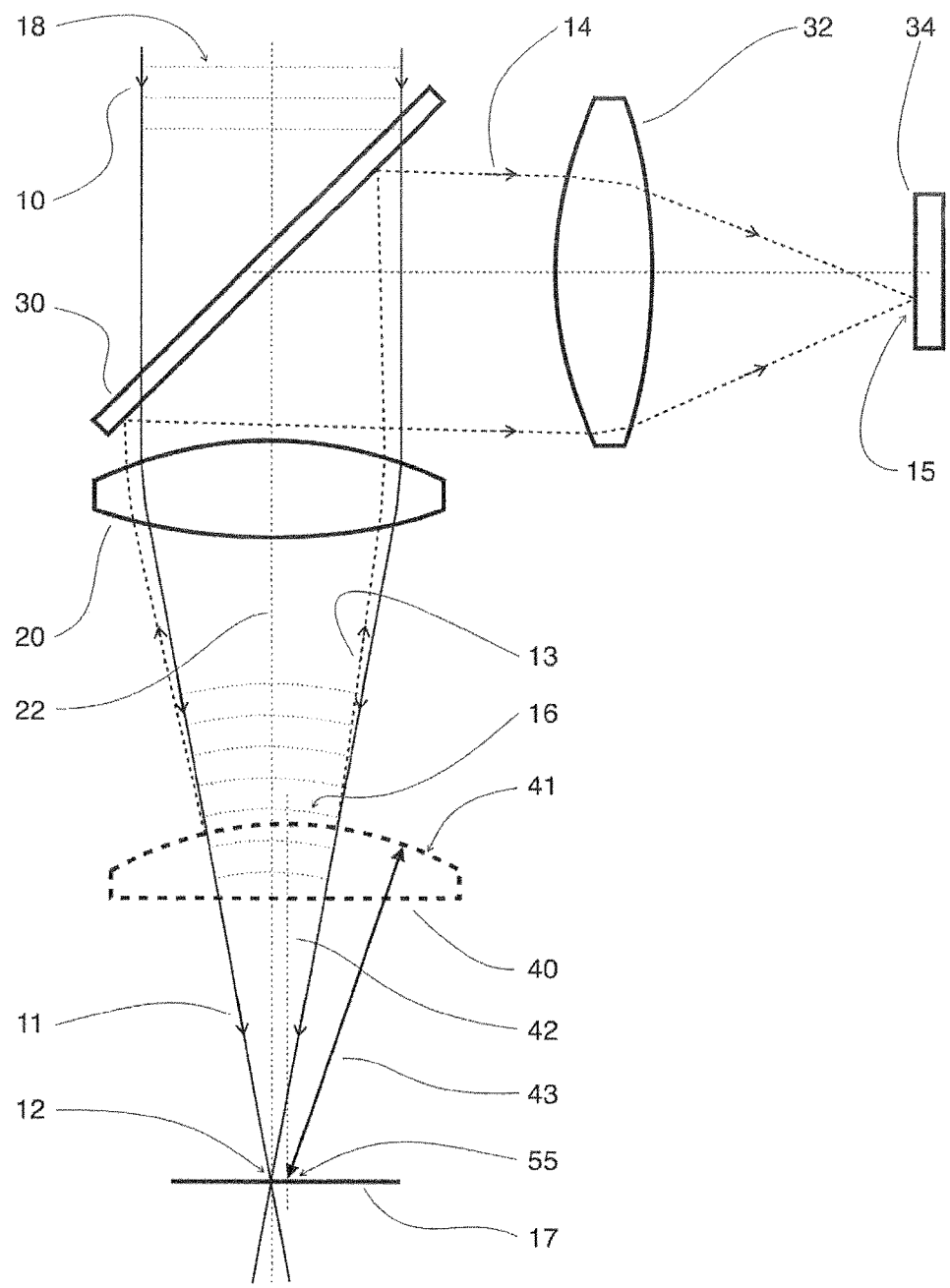

FIG. 3: A schematic representation of the invention in the embodiment according to FIG. 1 in an application situation in which the focus position of the laser beam slightly deviates laterally from the position of the center of curvature of the first surface of the reflector element.

Figure 4:
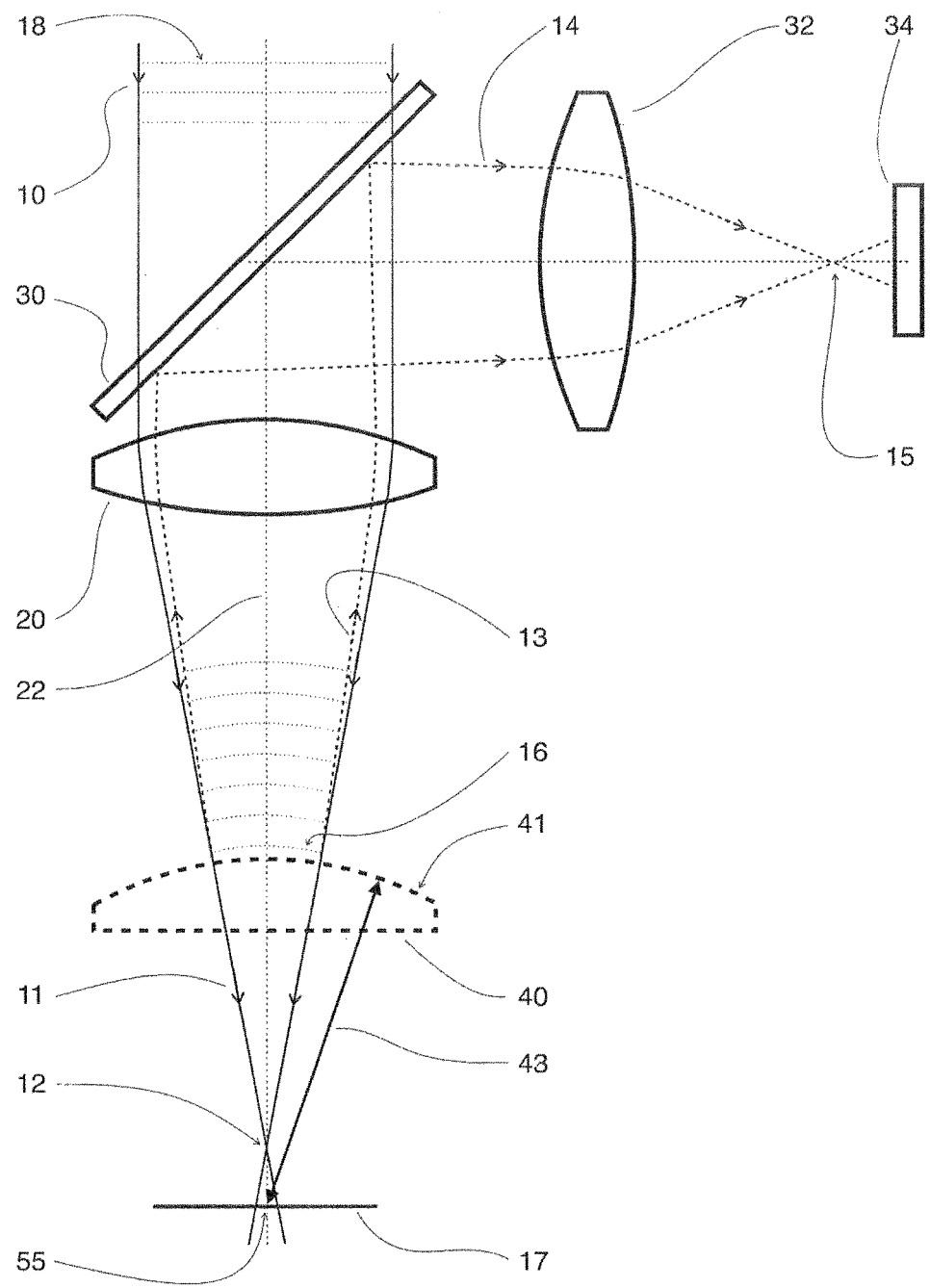

FIG. 4: A schematic representation of the invention in the embodiment according to FIG. 1 in an application situation in which the focus position of the laser beam slightly deviates axially from the position of the center of curvature of the first surface of the reflector element.

Figure 5:
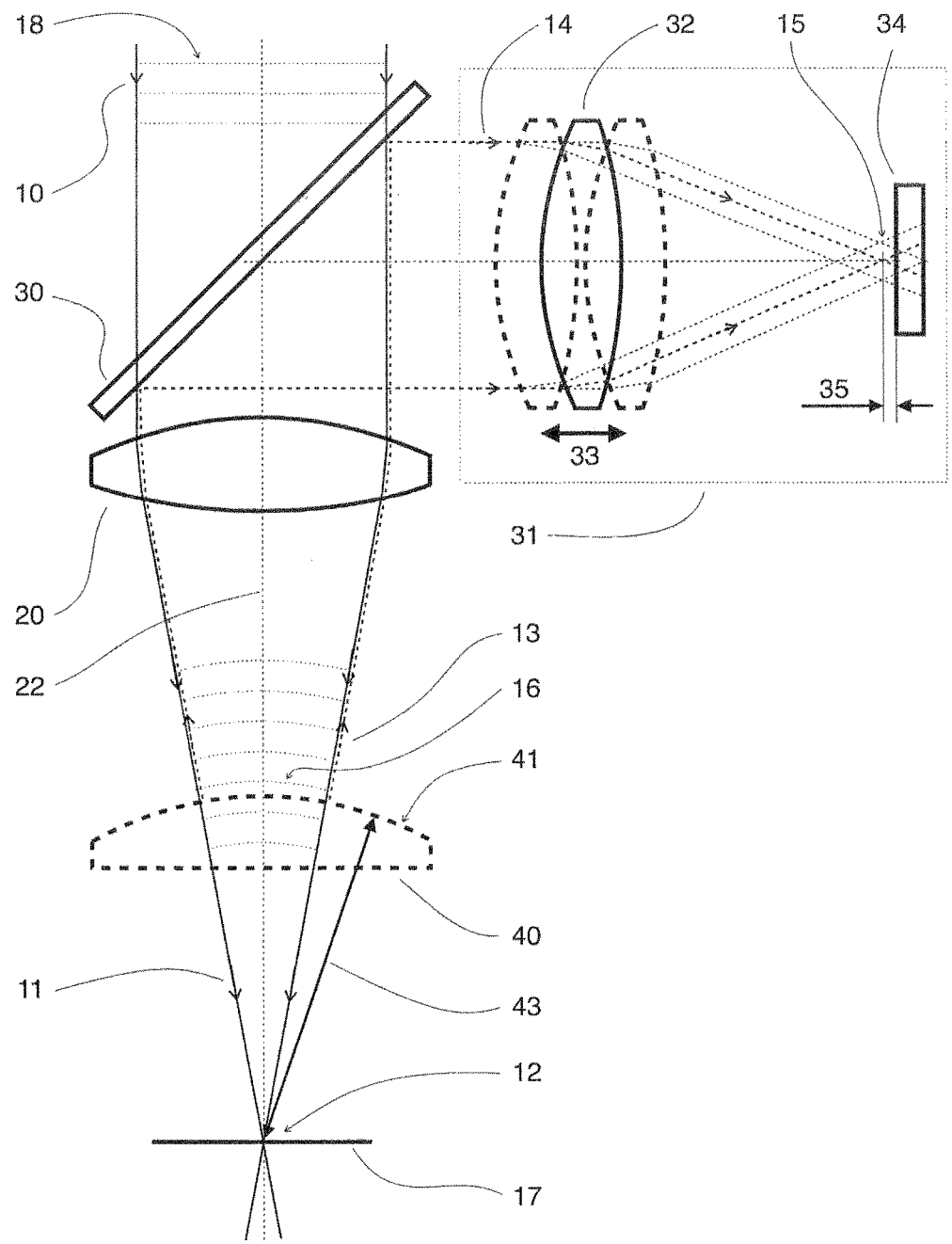

FIG. 5: A schematic representation of a further embodiment of the invention with a device for axially displacing the device for focusing the output coupled beam portion.

Figure 6:
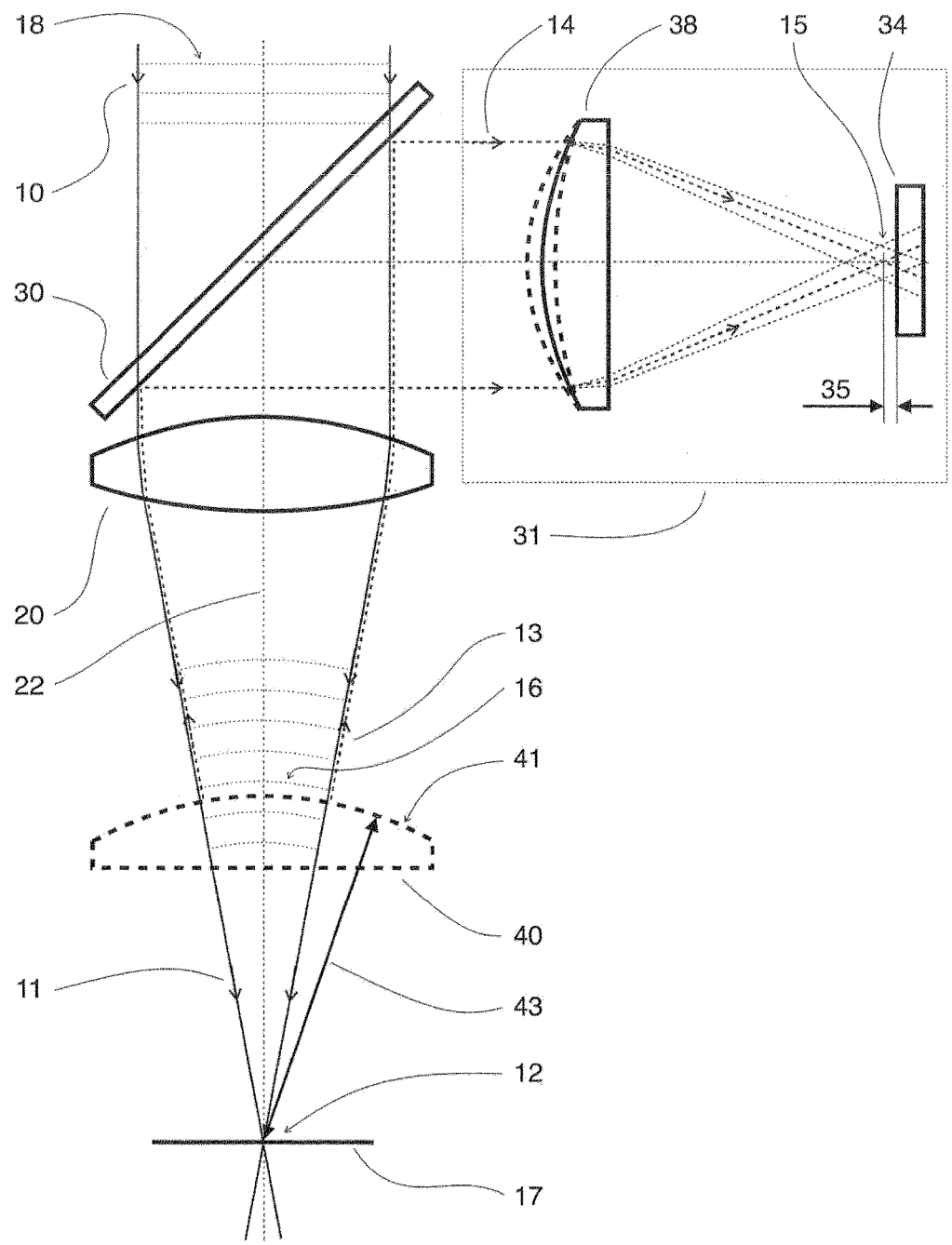

FIG. 6: A schematic representation of a further embodiment of the invention in which the device for focusing the output coupled beam portion comprises a lens element with an adjustable focal length.

Figure 7:
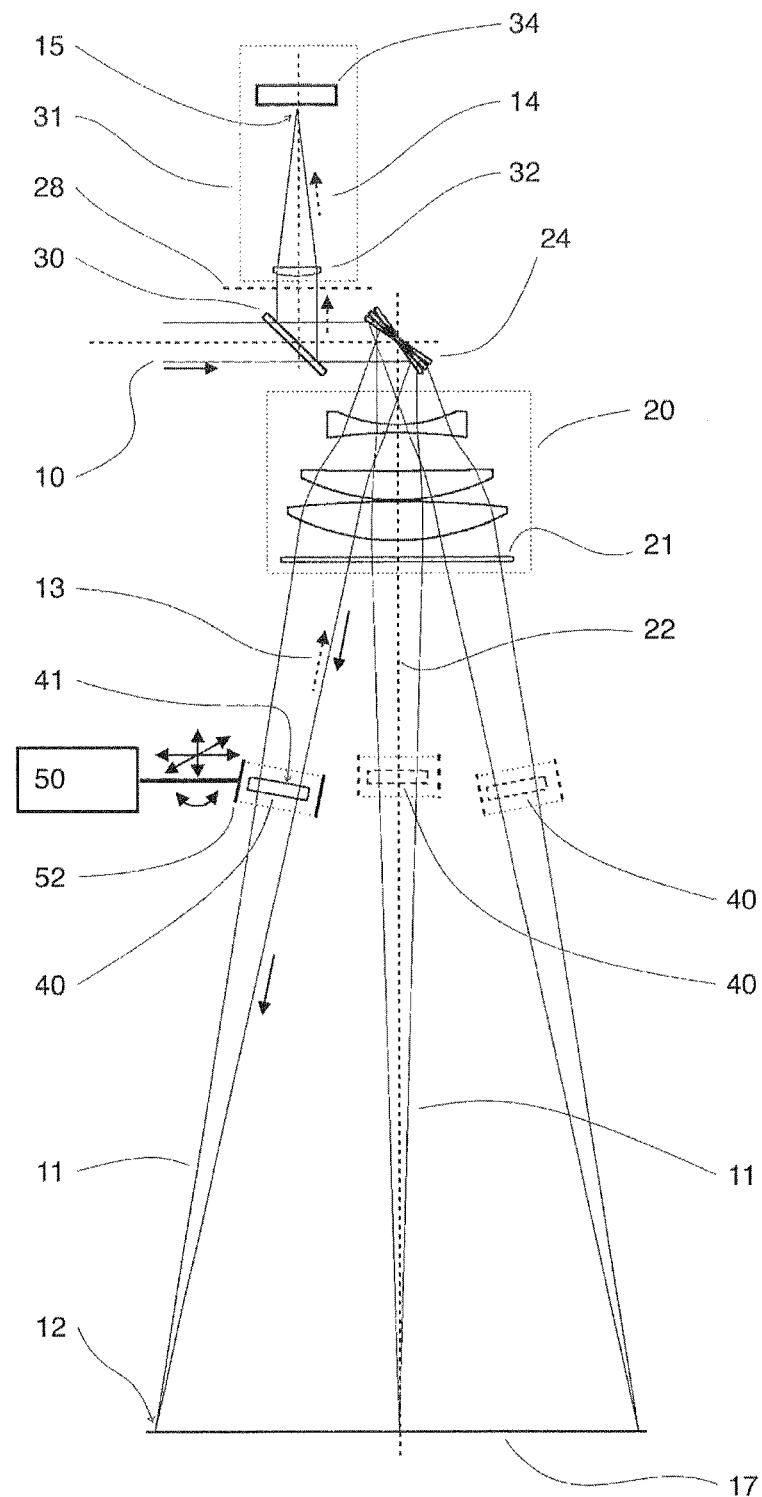

FIG. 7: A schematic representation of a further embodiment of the invention, in which the reflector element can be positioned and aligned in the laser beam by means of a positioning apparatus.

Figure 8:
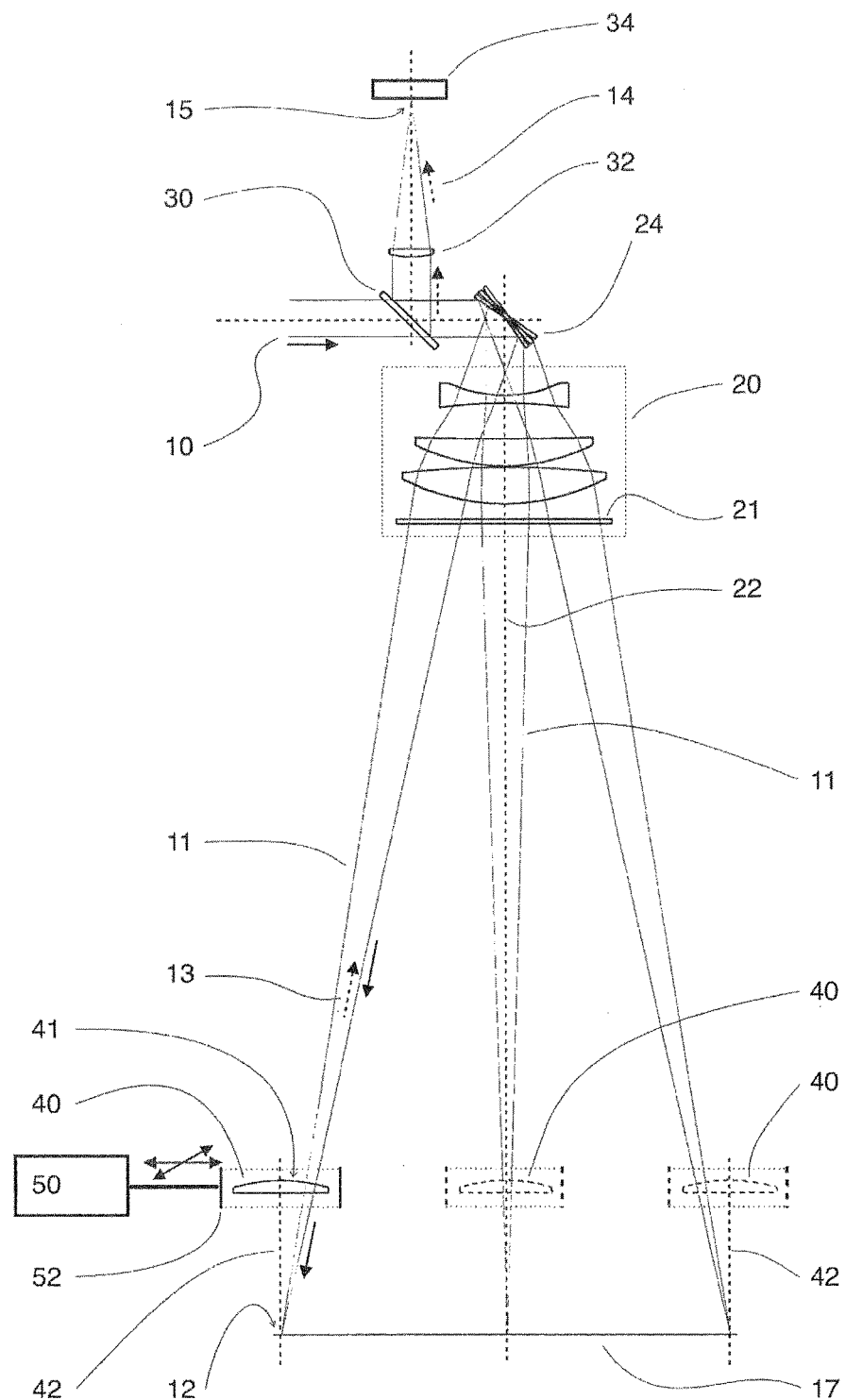

FIG. 8: A schematic representation of a further embodiment of the invention, in which the reflector element can be laterally positioned in the laser beam by means of a positioning apparatus.

Figure 9:
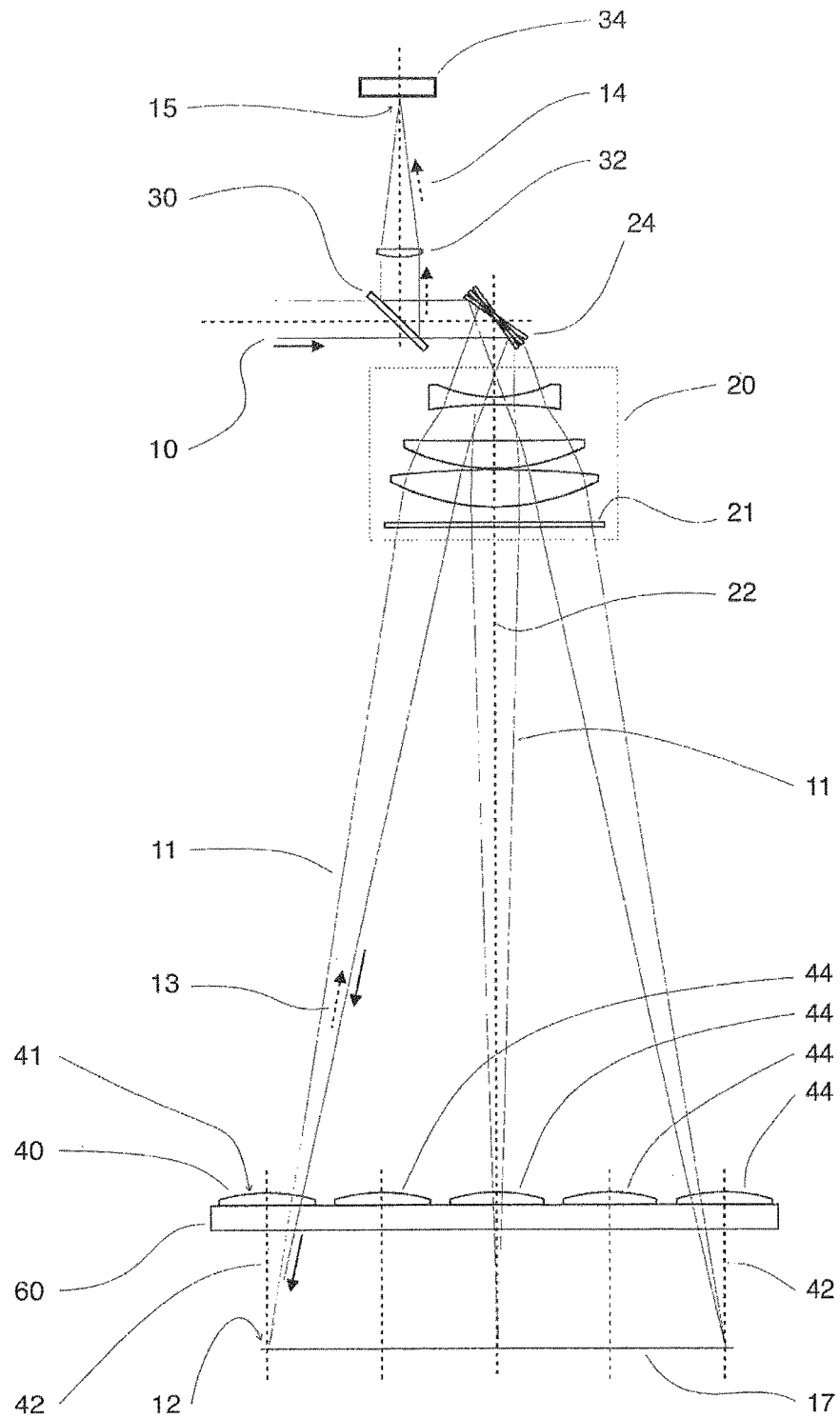

FIG. 9: A schematic representation of a further embodiment of the invention in which the reflector element and further reflector elements are arranged on a carrier plate and the carrier plate can be positioned in the laser beam.

Figure 10:
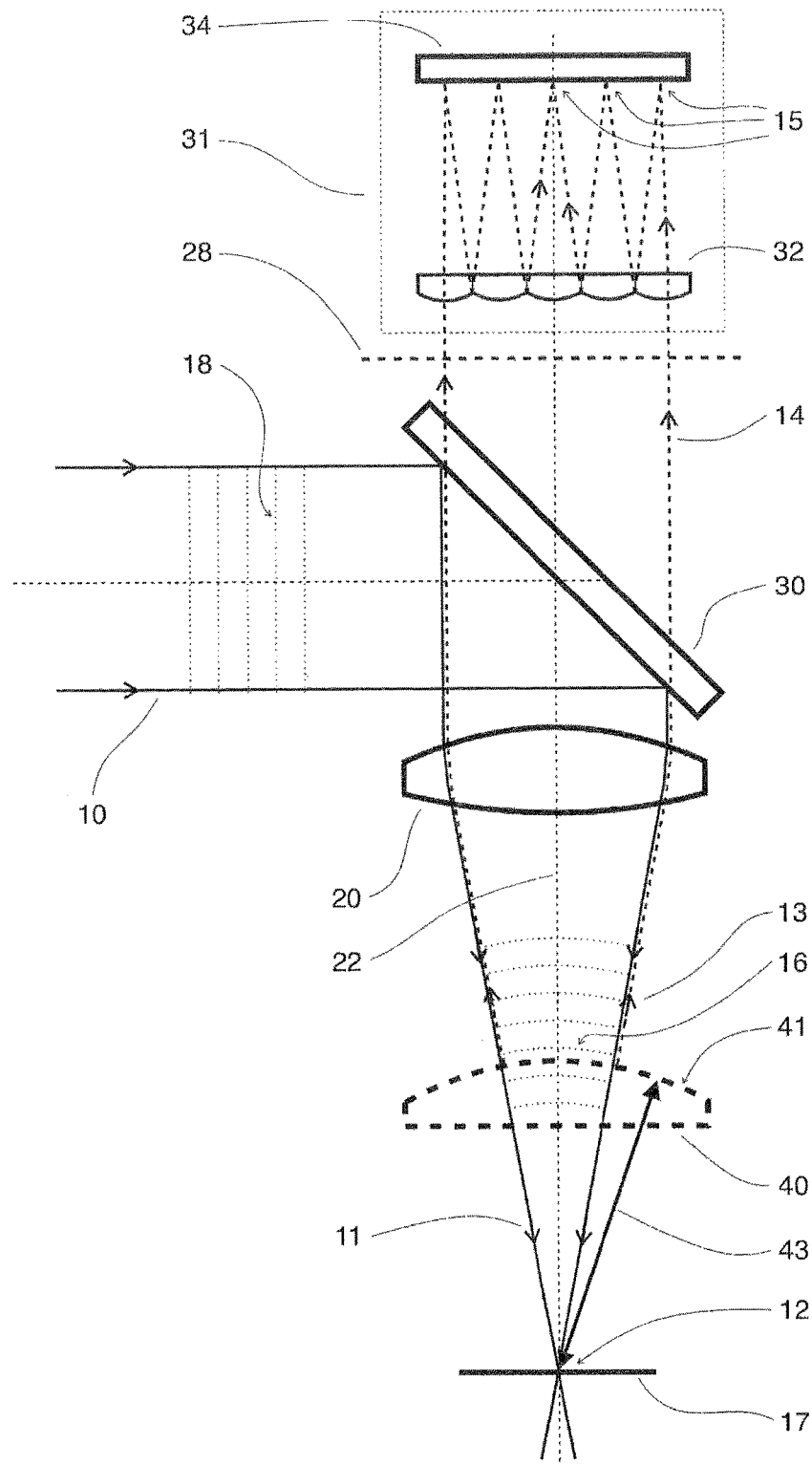

FIG. 10: A schematic representation of a further embodiment of the invention in which the beam diagnostic device is a wave front sensor.

Figure 11:
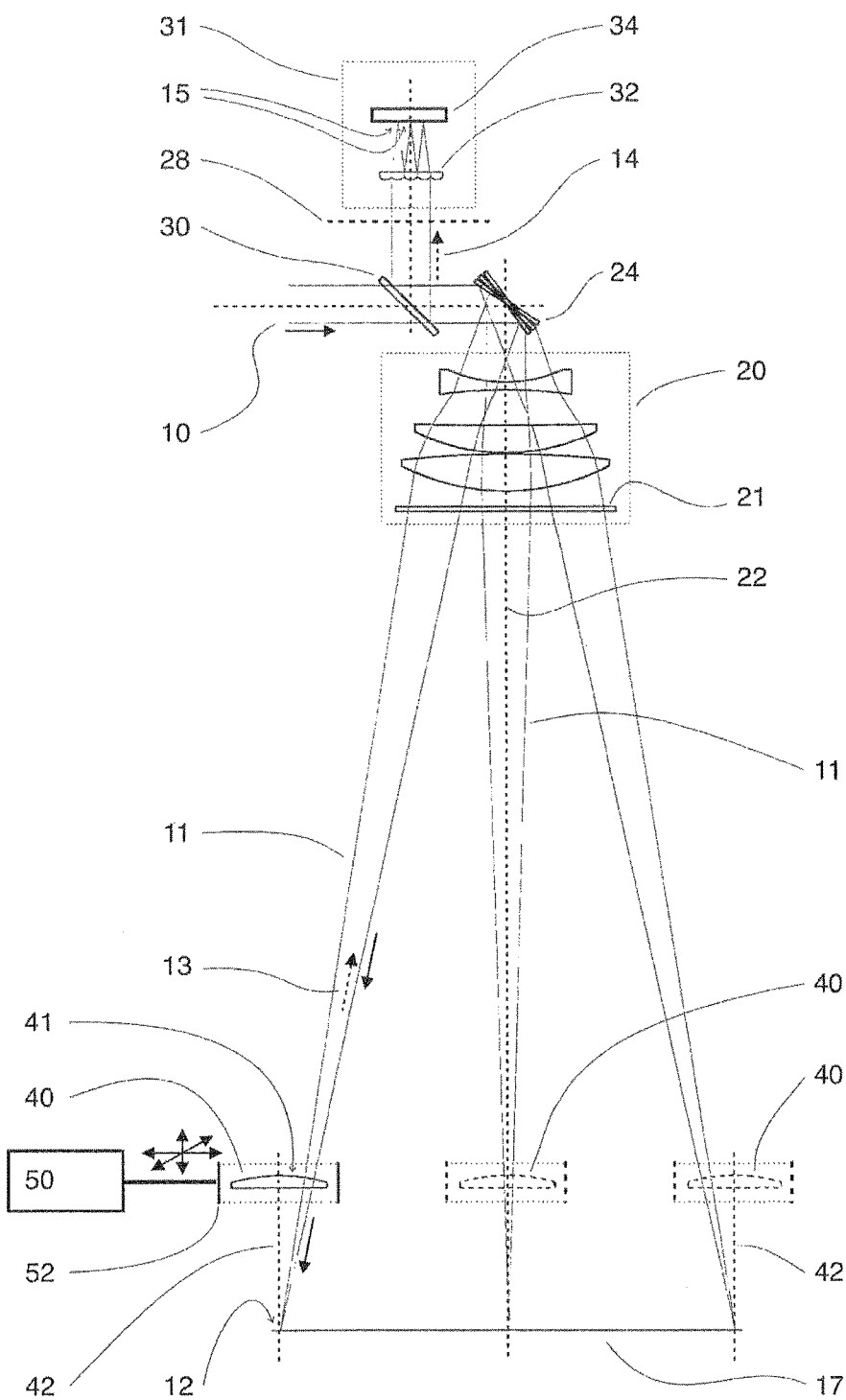

FIG. 11: A schematic representation of a further embodiment of the invention in which the beam diagnostic device is a wave front sensor and in which the reflector element can be displaced and positioned in three spatial directions by means of a positioning apparatus in the laser beam.

DETAILED DESCRIPTION OF THE INVENTION

FIG. 1 shows a schematic representation of a first embodiment of the invention. A laser beam 10 with a wave front 18 passes through a device 30 for coupling out a back-reflected beam component. The laser beam 10 is focused by an optical system 20. The laser beam 11 focused by the optical system 20 has a laser beam focus 12, which is located in a processing region 17. The focused laser beam 11 is convergent and therefore has concavely curved wave fronts.

A reflector element 40 can be introduced into the beam path of the focused laser beam 11. The reflector element 40 has a first surface 41, which is convexly curved and is oriented toward the optical system 20. The first surface 41 reflects a part of the focused laser beam 11 back into the optical system 20. The optical system 20 images the back-reflected beam component 13 in the reverse direction, thus the back-reflected beam component is collimated. By means of the device 30 for output coupling, a part of the back-reflected radiation is coupled out. The output coupled radiation 14 is measured by means of the beam diagnostic device 31. The beam diagnostic device 31 can optionally be connected via an opto-mechanical interface 28. In the beam diagnostic device 31, the output coupled radiation 14 is focused by a focusing device 32 onto a spatially resolving sensor 34 and forms an image 15 of the laser beam focus on the spatially resolving sensor 34.

In the embodiment of the invention shown in FIG. 1, the device 30 for output coupling the back-reflected beam component comprises a low-reflecting beam splitter. The laser beam 10 thus transmits the beam splitter almost completely in the straight direction. The back-reflected beam component 13, which passes through the optical system 20 in the opposite direction, also transmits the beam splitter almost completely in a straight direction. A small fraction of the back-reflected radiation 13 is reflected at the beam splitter and in this way forms a laterally output coupled beam portion 14.

A second embodiment of the invention is shown schematically in FIG. 2. This embodiment is similar to the first embodiment shown in FIG. 1 and differs in the specific embodiment of the device 30 for output coupling. In the embodiment of the invention shown in FIG. 2, the device 30 for output coupling the back-reflected beam component comprises of a highly reflective beam splitter. The laser beam 10 is thus almost completely reflected or deflected by the beam splitter. The back-reflected beam portion 13 is also almost completely reflected by the beam splitter. A small fraction of the back-reflected radiation 13 transmits the highly reflecting beam splitter and is thus coupled out in the straight direction.

FIG. 3 shows the invention in an embodiment according to FIG. 1. A situation is shown in the measurement of the laser beam, in which the focus position i.e. the position of the laser beam focus 12 of the focused laser beam 11, slightly deviates laterally from the position of the center of curvature of the first surface 41 of the reflector element 40. Such a situation occurs, for example, when the position of the reflector element 40 is calibrated to a target position 55 of the laser beam focus, and the actual position of the laser beam focus 12 differs slightly by an imprecise guidance of the laser processing optics from the target position 55. The radiation reflected back from the reflector element 40 then deviates by a small angle from the focused laser beam 11. The image 15 of the laser beam focus generated by the device 32 for focusing the output coupled radiation 14 is then laterally displaced on the spatially resolving sensor 34. In this way, inaccurate guidance, control or positioning of the focused laser beam 11 or of the laser processing optics can be detected.

In FIG. 4, the invention is also shown schematically in an embodiment according to FIG. 1. FIG. 4 shows a situation in the measurement of the laser beam in which the position of the laser beam focus 12 of the focused laser beam 11 slightly deviates axially from the position of the center of curvature of the first surface 41 of the reflector element 40. This situation is typical, for example, in the case where the optical system 20 is slightly soiled and is heated by the laser beam, whereby the focus position is shifted axially. This effect is called thermal focus shift. If the position of the reflector element 40 is calibrated to the correct target position (e.g. the processing plane 17) of the laser beam focus and the actual position of the laser beam focus 12 is shifted axially, then the divergence angle of radiation 13 back-reflected from the reflector element 40 deviates from the convergence angle of the focused laser beam 11. The image 15 of the laser beam focus, generated by the device 32 for focusing the output coupled radiation 14, is then also shifted axially. On the spatially resolving sensor 34, the beam diameter is thus increased so that a thermal focus shift can be detected.

FIG. 5 shows a schematic representation of a further embodiment of the invention. In this embodiment, the device 32 for focusing the output coupled radiation 14 is arranged to be axially displaceable by means of a device 33 for adjusting the image distance. The distance 35 between the image 15 of the laser beam focus and the spatially resolving sensor 34 can be varied by means of the image distance adjustment device 33.

A further embodiment of the invention is shown schematically in FIG. 6. In this embodiment, similar to the embodiment shown in FIG. 5, a device 33 for image distance adjustment is provided. In the embodiment according to FIG. 6, the device 32 for focusing the output coupled radiation 14 comprises a lens element 38 with an adjustable focal length.

A further embodiment of the invention is shown schematically in FIG. 7. The optical system 20 in this embodiment is part of scanner optics. The scanner optics typically also includes two pivot-mounted scanner mirrors 24, which are driven by a galvanometer drive. For simplicity of illustration, only one scanner mirror 24 is shown in FIG. 6. With the scanner mirrors, the laser beam focus 12 can be arbitrarily positioned in the processing region 17 and guided along a processing track. The reflector element 40 is coupled to a positioning apparatus 50. For this purpose, the reflector element 40 can be mounted in a bracket 52. By means of the positioning apparatus 50, the reflector element 40 can be positioned and aligned fitting the position of the laser beam focus 12 and the position of the focused laser beam 11.

FIG. 8 shows a schematic representation of a further embodiment of the invention. This embodiment is similar to the embodiment shown in FIG. 7, but in this embodiment, the positioning apparatus 50 is configured for the lateral positioning of the reflector element 40 in a plane parallel to the processing plane 17. The center of curvature of the first surface 41 of the reflector element 40 can thereby be adjusted particularly simply and precisely to the target positions 55 of the laser beam focus 12. For this purpose, the symmetry axis 42 of the reflector element 40 passes through the respective target position 55 of the laser beam focus 12.

A further embodiment of the invention is schematically illustrated in FIG. 9. In this embodiment, the optical system 20 is a component of scanner optics, similar to the embodiments shown in FIGS. 7 and 8. In the embodiment according to FIG. 9, a positioning apparatus for positioning the reflector element 40 is omitted. Instead, a carrier plate 60 can be introduced into a plane parallel to the processing plane 17. On the carrier plate 60, the reflector element 40 and further reflector elements 44 are arranged at different positions. The laser beam can be measured at all positions of the laser beam focus 12, which are defined by the symmetry axes 42 of the reflector element 40 and the further reflector element 44.

FIG. 10 shows a further embodiment of the invention. The device 32 for focusing within the beam diagnostic device 31 here comprises a lens array. The lens array and the spatially resolving sensor 34 form a wave front sensor, also referred to as a Shack-Hartmann sensor.

Finally, FIG. 11 shows an embodiment of the invention in which the optical system 20 is a component of a scanner optics and in which the beam diagnostic device 31 is configured as a wave front sensor with a lens array as a device 32 for focusing and with a spatially resolving sensor 34. In this figure, it is also shown by way of example that the positioning apparatus 50 can be configured to move and position the reflector element 40 in three spatial axes.

DETAILED DESCRIPTION OF THE INVENTION

It is intended to provide a solution to the problem of providing an apparatus and a method for beam diagnosis of optical systems for laser material processing, which are suitable for very high powers, which can also be used in an extended working range of the laser beam and which have higher accuracies in determining geometric beam parameters.

In order to solve the problem, an apparatus is proposed which comprises an optical system 20, which is configured for focusing a laser beam 10 into a processing region 17, a device 30 for output coupling radiation which is directed in a direction opposite to the laser beam 10 through the optical system 20, a beam diagnostic device 31, and a reflector element 40. The reflector element 40 has a first surface 41 which is partially reflecting and curved. The reflector element 40 can be positioned in a positioning region between the optical system 20 and the processing region 17. The curvature of the first surface 41 of the reflector element 40 is equal to a mean curvature of a wave front 16 of the laser beam 11 in the positioning region of the reflector element 40, the laser beam 11 being focused by the optical system 20.

To solve the problem, a method with the following method steps is also proposed. A laser beam 10 is focused by means of an optical system 20 into a processing region 17. A reflector element 40 with a first surface 41 is positioned in a positioning region between the optical system 20 and the processing region 17. The first surface 41 of the reflector element 40 is curved and the reflector element is positioned in a positioning region in which a mean curvature of the wave front of the laser beam focused by the optical system is equal to the curvature of the first surface of the reflector element. A portion of the focused laser beam 11 is reflected back on the first surface 41 of the reflector element 40 in the direction of the optical system 20. A portion of the back-reflected beam portion 13 is coupled out. At least one geometrical parameter is determined from the output coupled beam component 14 by means of a beam diagnostic device 31.

Further details of the invention-related method and the apparatus as well as further embodiments of the invention are described below. The invention is not limited to the individually described embodiments. Instead, individual features of different embodiments can also be combined with each other without departing from the scope of the invention.

The laser beam 10 is focused by the optical system 20 into a processing region 17. The work pieces to be joined or the material to be processed are usually placed in the processing region 17 during the laser material processing. The processing region 17 can be planar, for example, a plane. The processing region 17 can also be a three-dimensional region, that is to say that it can have an extension in the direction of the optical axis 22 of the optical system 20. The laser beam 10 can be generated directly as an approximately parallel or collimated light bundle from a laser source and directed to the optical system 20. The laser beam 10 can also be prepared via a beam guiding system, such as, for example, an optical fiber. In the latter case, collimation optics can be connected to the end of the optical fiber from which a laser beam is emitted, in order to produce an approximately parallel or collimated laser beam 10. A device 30 for output coupling a back-reflected partial beam is arranged in the beam path of the laser beam 10. The device for output coupling a back-reflected partial beam can, for example, be arranged in front of the optical system 20 in the propagation direction of the laser beam. This arrangement may be preferred in order not to reduce the working distance between the optical system 20 and the laser beam focus 12. However, it is also possible to arrange the device 30 for output coupling a back-reflected partial beam in the propagation direction of the laser beam after the optical system 20.

The device 30 for output coupling a back-reflected partial beam can, for example, comprise a beam splitter mirror with a very low degree of reflection such as a reflection-reducing coated planar plate or wedge plate. The laser beam 10 is transmitted by around 99% or more through the beam splitter mirror in the straight direction. In the reverse direction, a back-reflected partial beam 13 is also transmitted by 99% or more, a proportion of about 1% or less is reflected and is then available as a output coupled partial beam 14 for the beam analysis in the beam diagnostic device 31. Such a possible arrangement of the device 30 for output coupling a back-reflected partial beam is shown schematically in FIGS. 1 and 3 to 11. It is likewise provided that the device 30 for output coupling a back-reflected partial beam comprises a beam splitter mirror with a very high degree of reflection, such as a dielectrically coated mirror plate or wedge plate. In this embodiment, the laser beam 10 is reflected to about 99% or more, and is thus deflected. In the reverse direction, a back-reflected partial beam 13 is also reflected to 99% or more, a proportion of approximately 1% or less is transmitted in a straight direction and is then available as a output coupled partial beam 14 for the beam analysis in the beam diagnostic device 31. Such an arrangement is shown by way of example in FIG. 2. There are also other possibilities for coupling out a back-reflected partial beam, for example, the output coupling can also take place via a beam splitter with a diffraction structure applied on it.

The optical system 20 can, for example, be a focusing lens as part of a laser processing optical system. The optical system 20 can be as a further example also a so-called f-theta lens as a component of scanner optics. The optical system 20 may also be a planar field optic. The individual lens of the optical system 20 illustrated in FIGS. 1 to 6 and 10 is thus representative of optical systems or lenses with one or more lens elements. Likewise, the lens of three lenses exemplified in FIGS. 7 to 9 and 11 is representative of optical systems or lenses with one or more, that is, more than three, lens elements.

A reflector element 40 is positioned in the beam path of the focused laser beam 11 to produce a back-reflected partial beam 13. The reflector element 40, as an example, is not located in the beam path of the focused laser beam 11 during laser processing. The reflector element 40 is positioned for measuring the laser beam in a region between the optical system 20 and the processing region 17. The reflector element 40 comprises a first surface 41, which is curved and partially reflecting. The first surface 41 can, for example, be a surface (or boundary surface) of the reflector element 40 facing the optical system 20. The curvature of the first surface 41 of the reflector element 40 is approximately equal to the mean curvature of the wave front 16 of the focused laser beam 11 in the positioning region of the reflector element 40.

The first surface 41 can also be a surface of the reflector element 40 facing away from the optical system 20. In this case, the laser beam 11 focused by the optical system 20 first transmits the reflector element 40 before a fraction of the radiation is reflected on the first surface 41. The radius of curvature of the first surface 41 in this case is approximately equal to the mean radius of curvature of the wave front 16 of the focused beam 11 after transmission through the reflector element 40. When the beam is refracted, the radius of curvature of the first surface 41 and the center radius of curvature of the wave front 16 of the focused beam 11 after transmission through the reflector element 40 are approximately equal to the following equation 1:

$$R_{re}=(n\ s\ R_{to})/[R_{to}+s(n-1)] \quad \text{[Equation 1]}$$

The formula symbols have the following meaning: $R_{re}$ is the radius of curvature of the surface of the reflector element 40 on the side of the reflector element 40 remote from the optical system 20. $R_{to}$ is the radius of curvature of the surface of the reflector element 40 on the side of the reflector element 40 facing the optical system 20. n is the refractive index of the material of which the reflector element 40 is made. s is the distance of the reflector element 40 from the plane in which the laser beam focus 12 is situated without refraction through the reflector element 40.

The reflector element 40 can consist of, for example, an optically transparent material. The use of an optical material with very low absorption, such as, for example, quartz glass, is advantageous. At least a fraction of the laser beam 11 focused by the optical system 20 is reflected by the first surface 41 of the reflector element 40. The first surface 41 may be provided with a reflection-reducing coating; in that case a fraction is typically reflected in the range of about 0.1% to 1%. The first surface 41 may also be uncoated, in which case a fraction is typically reflected in the range of about 3% to 5%.

An optical lens with a spherical surface, for example a Plano-convex lens, can be used as the reflector element 40.

In one embodiment of the invention, it is also provided that the reflector element 40 is a concentric meniscus lens. The reflector element 40 then has no optical effect on the focused laser beam. In this embodiment, the reflector element 40 can also remain in the beam path during the laser processing. It is also possible in this embodiment that the two boundary surfaces, that is to say the front side and rear side of the reflector element 40, are partially reflecting surfaces and thus two images 15 of the laser beam focus are produced on the spatially resolving sensor 34. Therefore, in this embodiment, the two boundary surfaces of the reflector element perpendicular to the optical axis can be slightly displaced relative to one another so that the two images 15 of the laser beam focus are also laterally displaced relative to one another and do not interfere with each other on the spatially resolving sensor.

The reflector element 40 is positioned and aligned in such a way that the back-reflected component 13 of the focused laser beam 11 is directed back into the optical system 20 and is imaged by the optical system 20 in the opposite direction to the laser beam 10.

The laser beam 11 focused by the optical system 20 is convergent. The wave front 16 or the phase surface of the focused laser beam 11 is therefore concavely curved when viewed in the propagation direction. If a region of the focused laser beam 11 is viewed, which is at least a few Rayleigh lengths away from the position of the laser beam focus 12, then the radius of curvature of the concavely curved wave front 16 of the focused laser beam 11 corresponds approximately to the distance of the respective wave front 16 to the position of the laser beam focus 12.

According to the invention, the first surface 41 of the reflector element 40 is curved and the curvature of the first surface 41 corresponds to the curvature of the wave front 16 of the focused laser beam 11 in the positioning region of the reflector element 40. The effect of the reflector element 40 is therefore comparable to a phase-conjugating mirror, that is, the focused laser beam 11 is partially reflected back into itself by the first surface 41.

From the apparatus according to the invention and the design of the reflector element 40, numerous advantages result in the determination of parameters of the laser beam:

The focus position and divergence or convergence angles of the back-reflected radiation coincide with the focus position and the divergence or convergence angle of the laser beam.

The optical system 20 whose correction is matched to the imaging of the laser beam 10, therefore also optimally images the back-reflected partial beam 13 in the opposite beam direction and with minimal aberrations.

The extension or the diameter and the focus-axis of the back-reflected partial beam 13 coincide with the sizes of the laser beam 11, so that during the re-imaging of the reflected partial beam 13, there is no partial shading or vignetting due to the limited dimensions of the lenses of the optical system or the deflection or scanner mirrors.

The laser beam focus 12 in the processing region 17 and the image 15 of the laser beam focus on the spatially resolving sensor 34 are in a clearly defined imaging ratio so that the parameters of the laser beam in the processing region 17 can precisely recalculated from the measurement of the image 15 of the laser beam focus.

A deviating focus position in the processing plane 17 is detected by a deviation of the position of the image 15 of the laser beam focus on the spatially resolving sensor 34 when the position of the reflector element 40 has been previously calibrated.

Angle and polarization dependencies of the degree of reflection of the first surface 41 or of the coating of the first surface 41 of the reflector element 40 have no effect since the propagation vector of the focused laser beam 11 is virtually always perpendicular to the first surface 41 of the reflector element 40; the degree of reflection is thus constant, as a result of which a quantitative calibration is also made possible, for example, for determining the power density.

Due to the back-reflection of a small portion of the radiation and the output coupling, the beam component on the sensor is attenuated by several orders of magnitude so that laser radiation with very high power can also be measured. In addition, the back-reflected portion of the beam which is to be measured does not transmit the reflector element, so that no additional thermally induced changes in the refractive power influence the beam diagnosis.

A fraction of the back-reflected beam 13 is separated from the beam path of the laser beam 10, for example laterally, by means of the device 30 for output coupling the back-reflected beam component 13, and is available as a output coupled beam component 14 of the beam diagnostic device 31. The beam diagnostic device 31 can optionally be connected to the other part of the device via an opto-mechanical interface 28. The beam diagnostic device 31 includes, for example, a device 32 for focusing and a spatially resolving sensor 34. The output coupled beam portion 14 is focused by the means of device 32 for focusing on the spatially resolving sensor 34. The spatially resolving or location-resolving sensor 34 can be a pixel-based sensor such as, for example, a CCD camera or a CMOS sensor.

In the device 32 for focusing, the required refractive power can be generated with different optical elements. A single lens or a system of several lenses can be used. Gradient index lenses, Fresnel lenses or diffraction lenses may also be used. The use of mirror lenses is also possible.

The spatially resolving sensor 34 detects the intensity distribution of the back-reflected, output coupled and focused beam portion. This intensity distribution is thus a direct image of the intensity distribution of the laser beam focus 12 in the processing region 17. Different parameters of the laser beam, for example the diameter of the laser beam, the focus diameter of the laser beam, the lateral position of the laser beam in the processing plane, the axial focus position, the intensity distribution of the laser beam, the beam profile of the laser beam, the wave front of the laser beam, the path velocity of the laser beam, or the seam energy of the processing track can be determined from the intensity data of the spatially resolving sensor 34.

The laser beam focus 12 in the processing plane 17 and the image 15 of the laser beam focus on the spatially resolving sensor 34 are in an exactly defined imaging ratio to each other. This is achieved by the quasi-phase-inverted reflection of the focused laser beam 11 on the first surface 41 of the reflector element 40. The reflection acts almost phase-inverting when the wave front 16 of the focused laser beam 11 is coincident with or concentric with the first surface 41. For this purpose, the center of curvature of the first surface 41 must be located approximately at the position of the laser-beam focus 12, since the wave fronts of a focused beam are concentric with the focus point, provided that the wave fronts are more than a few Rayleigh lengths away from the focus point. The laser beam 10, 11 may have a higher order of modes and/or aberrations. The wave front 18 of the laser beam 10 is then not ideally planar, and the wave front 16 of the focused laser beam may have a shape slightly different from an ideal spherical shape. It is therefore provided that the curvature of the first surface 41 of the reflector element 40 corresponds to the mean curvature of the wave front 16 of the focused laser beam 11.

The imaging ratio M or the magnification between the image 15 of the laser beam focus on the spatially resolving sensor 34 and the laser beam focus 12 in the processing plane 17 is specified by the following equation 2:

$$M = f_{FA}/f_{OS} \quad \text{[Equation 2]}$$

Here, $f_{OS}$ is the focal length of the optical system 20 and $f_{FA}$ is the focal length of the device 32 for focusing the output coupled radiation 14. Thus, the parameters of the output coupled beam 14 determined by means of the spatially resolving sensor 34 can be exactly converted to the parameters of the focused beam 11. The focus diameter $\varnothing_{Fok}$ of the laser beam focus 12 is thus determined by the following relation from the focus diameter $\varnothing_{Mess}$ measured with the spatially resolving sensor 34:

$$\varnothing_{Fok} = \varnothing_{Mess} \cdot f_{OS}/f_{FA} \quad \text{[Equation 3]}$$

In order to achieve a high resolution in the determination of the beam parameters, it can thus be advantageous to select a large focal length $f_{FA}$ of the device 32 for focusing, which results in a correspondingly long beam path. In order to make the apparatus nonetheless compact, it is provided in a further embodiment of the invention that the device 32 for focusing comprises a tele-construction, that is to say a combination of two lens groups spaced apart, whereby one lens group shows a positive focal length and the other lens group has a negative focal length. This allows a considerably shorter overall length to be achieved despite overall long focal length. Alternatively or additionally, the beam path between the device 32 for focusing and the spatially resolving sensor 34 can be folded by means of the use of deflection mirrors.

If the reflector element 40 is positioned such that the center of curvature of the first surface 41 coincides with the position of the laser beam focus 12, then the back-reflected beam component 13 exactly corresponds to the focused beam 11 in the reverse direction. In this case, the image 15 of the laser beam focus is located on the axis, and is thus centered on the spatially resolving sensor 34. This situation is illustrated in FIGS. 1 and 2.

If, during the measurement of the laser beam, the actual position of the laser beam focus 12 of the focused laser beam 11 deviates laterally from the target position 55 of the laser beam focus 12 and the position of the reflector element 40 is set at the target position 55 of the laser beam focus, then the position of the center of curvature of the first surface 41 of the reflector element 40 no longer matches the actual position of the laser beam focus 12. In the case of this situation illustrated in FIG. 3, the radiation 13 reflected back from the reflector element 40 differs by a small angle from the focused laser beam 11. The image 15 of the laser beam focus generated by the device 32 for focusing the output coupled radiation 14 is then laterally displaced on the spatially resolving sensor 34. In this way, inaccurate guidance, control or positioning of the focused laser beam 11 or of the laser processing optics can be detected.

An axial deviation of the actual position of the laser beam focus 12 from the target position 55 of the laser beam focus 12 has a somewhat different effect, this situation being illustrated in FIG. 4. Again, it is assumed that the position of the reflector element 40 is set to the target position 55 of the laser beam focus. An axial deviation of the actual position of the laser beam focus 12 causes the divergence angle of the radiation 13 reflected back from the reflector element 40 to deviate from the convergence angle of the focused laser beam 11. The image 15 of the laser beam focus generated by the device 32 for focusing the output coupled radiation 14 is then shifted axially so that an enlarged beam diameter is registered on the spatially resolving sensor 34. In this way, for example, a thermal focus shift of the optical system 20 or of the protective glass 21 can be recognized.

The beam diagnostic device 31 includes the device 32 for focusing and the spatially resolving sensor 34. The beam diagnostic device 31 can comprise further components, for example elements for the spectral filtering of the radiation, elements for attenuating the radiation, elements for generating sub-regions or sub-apertures of the radiation, beam splitters for splitting the output coupled radiation, as well as further sensors.

In the beam path between the device 30 for the output coupling and the spatially resolving sensor 34, apertures or aperture plates can be arranged. The apertures may be arranged to mask or reduce reflections from other interfaces in the optical system 20. An aperture plate may, for example, comprise a perforated grid plate. The measurement of the output coupled beam can thereby be selectively applied to individual or several sub-regions or sub-apertures of the beam.

An opto-mechanical interface 28 can be provided between the device 30 for output coupling and the device 32 for focusing. By means of this interface 28, the beam diagnostic device 31, comprising the device 32 for focusing and the spatially resolving sensor 34, can be detachably connected to another part of the apparatus, for example, a laser processing optics or a scanner optics. The beam diagnostic device 31 can be permanently connected to the laser processing optics or the scanner optics. The opto-mechanical interface 28 also allows the beam diagnostic device 31 to be connected to the laser processing optics or the scanner optics only for the purpose of measuring the laser beam.

An embodiment of the invention is provided in which the device 32 for focusing comprises a lens array. The lens array includes a number of in parallel arranged small lenses. The lens array may also be a micro-lens array. The small lenses capture sub-regions (sub-apertures) of the output coupled beam 14 and focus these sub-regions on the spatially resolving sensor 34. A number of laterally separated individual spots are thereby generated on the sensor. Each spot is an image 15 of the laser beam focus. From the position of the individual spots on the sensor 34, the inclination of the wave front of the output coupled beam 14 can be determined in the sub-aperture of the beam belonging to the respective spot. The wave front of the output coupled beam 14 can be reconstructed from the entirety of the individual spots on the sensor 34, and the parameters of the laser beam 10, 11 can be calculated there from. The combination of lens array and spatially resolving sensor is also called "wave front sensor" or "Shack-Hartmann sensor". To adjust the dimension of the output coupled beam 14 to the dimensions of the lens array and the spatially resolving sensor 34, a telescope can be arranged between the device 30 for output coupling and the device 32 for focusing.

In a further embodiment of the invention, the axial distance 35 between the spatially resolving sensor 34 and the image 15 of the laser beam focus can be varied by means of a device 33 for adjusting the image distance. For this purpose, for example, the device 32 for focusing the output coupled beam portion 14 is mounted in an axially movable manner and can be axially displaced by means of a drive. It is likewise provided that, for the adjustment of the image distance, a single lens can be displaced axially within the device 32 for focusing. Furthermore, an embodiment is provided in which the image-distance-adjusting device 33 includes a device for displacing the axial position of the spatially resolving sensor 34. In this embodiment, the spatially resolving sensor 34 is axially displaceable and can be displaced by means of a drive. It is also provided that the image distance adjusting device 33 comprises a variable focal length lens element 38, for example, an electrically adjustable liquid lens.

The axial distance 35 between the spatially resolving sensor 34 and the position of the image 15 of the laser beam focus (i.e. the focus position of the output coupled radiation 14) can be varied by means of the device 33 for the image distance adjustment, the intensity distribution with the spatially resolving sensor 34 can be recorded in each of the planes of the output coupled, focused beam portion. In this way, the caustics of the beam can be scanned in the region of the beam waist (i. e. in the region near the image 15 of the laser beam focus). By means of this data, the axial focus position can be determined on one hand. A deviation can also be determined from the comparison with an axial focus position stored as a reference, for example, if a thermal focus shift is present, that is to say, if the axial focus position of the focused laser beam 11 changes due to thermal changes in the optical system 20 or in the protective glass 21, and thus the laser beam focus 12 no longer is located in the processing plane 17. On the other hand, the beam parameter product of the laser beam can also be determined by the scanning of the beam caustics, i.e. the product of the diameter of the beam waist (focus diameter) and the divergence angle of the beam.

Further embodiments of the invention are provided in which several planes or beam cross-sections are recorded simultaneously in the output coupled beam 14. For this purpose, for example, one or more additional beam splitters are arranged in the output coupled beam which deflect a part of the beam in each case to one or more further spatially resolving sensors which are arranged at different distances (or in different optical path lengths) from the device 32 for focusing. The multiple divided partial beams of the output coupled beam 14 can also be directed jointly onto a spatially resolving sensor 34. The individual partial beams are then preferably directed to the spatially resolving sensor 34 with a small lateral offset. For this purpose, for example, an etalon can be used, which is positioned at an angle to the optical axis in the beam path in front of the spatially resolving sensor 34. The front and back side of the etalon are partly reflective. This produces a number of partial beams with different path lengths and lateral offset. Instead of an etalon, a plan-parallel plate, two beam splitters arranged parallel to one another, or a wedge plate pair can also be used for this purpose. By simultaneous recording of several planes or beam cross sections, the beam caustics can be determined.

The optical system 20 may be part of a laser processing optics. The laser processing optics is usually mounted on an automated handling system such as a guiding machine or a robot. The laser beam focus 12 is guided along the work piece-joining contour with the handling system. To determine dynamic processing parameters, it is provided that the reflector element 40 is positioned above a point of the desired joining contour. This point can be a target position 55 of the laser beam focus 12 and the reflector element 40 is positioned in such a way that the center of curvature of the first surface 41 of the reflector element 40 and the target position 55 of the laser beam focus 12 coincide. When the laser beam is guided along the joining contour, the laser beam is thus also guided over the reflector element. At the same time, several images with a short exposure time can be recorded, read out and recorded in rapid succession by means of the spatially resolving sensor. The image 15 of the laser beam focus is located centrally on the spatially resolving sensor 34 during the recording taken at the time at which the laser beam focus 12 just crosses the target position 55. The image 15 is laterally displaced on the sensor 34 before and after that. When comparing two consecutive recordings, the path velocity can be determined from the time-taking distance and the offset of the image 15 of the laser beam focus. It is also provided to receive a recording with a long exposure time while the laser beam is guided along the joining contour and thus over the reflector element 40. The recorded image then contains a "smeared" track of the laser beam whose intensity is a measure of the seam energy of the processing track.

The optical system 20 can also be a component of a scanner optics in which the laser beam 10 is deflected laterally for example by means of galvanometer-driven deflecting mirrors and the laser beam focus 12 can be positioned and moved within a processing plane 17. A deflection of the beam can also take place by means of a polygon mirror scanner. A further possibility for deflecting the beam is the use of acousto-optic modulators. By means of the devices mentioned, the laser beam focus 12 can be moved or positioned within the processing region 17. The addressable processing region 17 may be a surface or a plane. It is also possible to provide the axial position of the laser beam focus 12 in an adjustable manner by means of an additional device. This additional device can, for example, be an axially adjustable lens, which can be arranged before or after the beam deflection. Such a system is also referred to as a 3D scanner. The laser beam focus 12 can thus be moved or positioned within a three-dimensional processing region 17.

In such arrangements, it is desirable to be able to determine the parameters of the laser beam at several different positions in the working space or in the processing plane 17.

In a further embodiment of the invention, it is therefore provided that the reflector element 40 or the bracket 52 of the reflector element 40 is coupled to a positioning apparatus 50. By means of the positioning apparatus 50, the reflector element 40 can be positioned and aligned fitting to the position of the laser beam focus 12 and the position of the focused laser beam 11. FIG. 7 shows an embodiment in which the reflector element is positioned closer to the optical system 20. In this case it is advantageous that the power density on the reflector element is relatively low and that the positioning apparatus can cover a smaller positioning region. A disadvantage is that, in addition to the lateral positioning, an inclination adjustment or an angular orientation of the reflector element is also required.

An embodiment of the invention is also provided in which the positioning of the reflector element is operated closer to the processing plane 17 by means of the positioning apparatus 50. The embodiment is shown in FIG. 8. Since the reflector element 40 is positioned closer to the laser beam focus 12, the first surface 41 must be more curved. The reflector element 40 can then be dimensioned to be sufficiently large, so that an angular alignment can be omitted. The positioning apparatus must then only be configured to laterally position the reflector element 40 in a plane parallel to the processing plane 17. Although the positioning apparatus 50 must cover a larger positioning range, it can be made substantially simpler due to the lack of angular adjustment. The center of curvature of the first surface 41 of the reflector element 40 can thus be adjusted particularly simply and precisely to the target positions 55 of the laser beam focus 12.

In a possible embodiment of the invention, the positioning apparatus 50 is configured for positioning the reflector element 40 in three spatial directions. In an associated method, in the case of a fixed, focused laser beam 11, the reflector element 40 is displaced in the three spatial directions by means of the positioning apparatus 50 and positioned in such a way that the output coupled, focused beam component (i.e. the image 15 of the laser beam focus) is located centrally on the spatially resolving sensor 34, and so that the diameter of the output coupled, focused beam component on the spatially resolving sensor is at its minimal value. The first surface 41 of the reflector element then is exactly concentric to the wave front 16 of the focused laser beam 11 and thus the center of curvature of the first surface 41 lies in the position of the laser beam focus 12. The exact position of the laser beam focus 12 can then be determined from the position- and/or control data of the positioning apparatus 50.

In another embodiment of the invention, a possibility for measuring the laser beam is provided at various positions in the processing plane 17 without an adjustment of the position of the reflector element 40 being required for this purpose by means of a positioning apparatus. In this embodiment, a carrier plate 60 can be inserted into a plane parallel to the processing region 17. The position of the carrier plate 60 can be reproducible, for example by means of locating pins on the carrier plate 60, which engage in corresponding seats in the processing region 17. On the carrier plate 60, the reflector element 40 and further reflector elements 44 are arranged at different positions. The laser beam can be measured at all positions of the laser beam focus 12, which are defined by the symmetry axes 42 of the reflector element 40 and the further reflector element 44. For example, plano concave lenses, which are arranged in the form of a matrix on a transparent glass plate as carrier plate 60, can be used as reflector elements 40, 44.

An absorber can be arranged below the reflector element 40 or below the carrier plate 60 for collecting the laser power during the measurement of the laser beam. In order to reduce the power density of the beam on the absorber, it is designated to provide the bottom side of the reflector element 40 or the carrier plate 60 with a diffusing structure.

It is furthermore provided that the spatially resolving sensor 34 receives the radiation back-scattered by the processing procedure during normal laser processing, i.e. without the reflector element 40 positioned in the focused laser beam 11, and the image of this scattered radiation is permanently evaluated. Since the back-scattering process can be subject to dynamic fluctuations and can take place in any direction, the information obtained there from about the diameter of the laser beam focus 12 will generally be less accurate. However, significant deviations from a target value can be detected in this way, and upon the occurrence of such deviations, a signal can be set, whereupon a precise check can be initiated of the laser beam parameter or parameters by means of the positioning of the reflector element 40 or the carrier plate 60 in the focused laser beam at the next possible opportunity in the process cycle.

LIST OF REFERENCES

10 Laser beam
11 Focused laser beam
12 Laser-beam focus
13 Back-reflected partial beam
14 Output coupled partial beam
15 Image of laser beam focus
16 Wave front of the focused laser beam
17 Processing region
18 Wave front of the laser beam
20 Optical system
21 Protective glass
22 Optical axis of the optical system
24 Scanner mirror
28 Opto-mechanical interface
30 Device for output coupling of radiation
31 Beam diagnostic device
32 Focusing device
33 Image distance adjustment device
34 Spatially resolving sensor
35 Distance between image of laser beam focus and spatially resolving sensor
38 Lens element with adjustable focal length
40 Reflector element
41 First surface of the reflector element
42 Symmetry axis of the reflector element
43 Radius of curvature
44 Additional reflector elements
50 Positioning apparatus
52 Bracket 55 Target position of the laser beam focus
60 Carrier plate

What is claimed is:

1. An apparatus for determining geometrical parameters of a laser beam, comprising:
an optical system configured to focus the laser beam into a processing region,
a device for output coupling of radiation that travels in a direction opposite to a direction of travel of the laser beam through the optical system,
a beam diagnostic device, and
a first reflector element with a first surface,
wherein the first reflector element is placeable in a positioning region between the optical system and the processing region,
wherein the first surface of the first reflector element is partially reflecting and is curved,
wherein a curvature of the first surface is equal to a mean curvature of a wave front of laser beam in the positioning region of the first reflector element, and
wherein the focused laser beam is focused by the optical system.

2. The apparatus according to claim 1, wherein the first surface of the first reflector element is set concentrically to the wave front of the focused laser beam.

3. The apparatus according to claim 1, wherein a center of curvature of the first surface of the first reflector element is set to a target position of a laser beam focus of the focused laser beam.

4. The apparatus according to claim 1, further comprising additional reflector elements, wherein each of the additional reflector elements has a first surface, wherein the first surface of the first reflector element and the first surfaces of the additional reflector elements have an equivalent curvature and wherein the first reflector element and the additional reflector elements are arranged at different positions in a planar region parallel to the processing region.

5. The apparatus according to claim 1, wherein the optical system for focusing the laser beam is part of scanner optics of remote laser material processing system.

6. The apparatus according to claim 1, wherein the beam diagnostic device comprises a device for focusing the output coupled radiation and a spatially resolving sensor.

7. The apparatus according to claim 6, wherein the device for focusing comprises a lens array.

8. The apparatus according to claim 6, wherein the beam diagnostic device further comprises an image distance adjusting device, and wherein the image distance adjusting device is configured to change an axial distance between the spatially resolving sensor and a position of an image of the laser beam focus.

9. The apparatus according to claim 8, wherein the image distance adjusting device comprises a device for axially displacing the image distance adjusting device for focusing of the output coupled radiation.

10. The apparatus according to claim 8, wherein the image distance adjustment device comprises a lens element with adjustable focal length.

11. The apparatus according to claim 1, wherein a determination of geometric parameters of the laser beam comprises determining at least one of the variables selected from the group consisting of: a diameter of the laser beam, a focus diameter of the laser beam, a lateral position of the laser beam in the processing region, an axial focus position, an intensity distribution of the laser beam, a beam profile of a the laser beam, a wave front of the laser beam, a laser beam path velocity, and seam energy of a processing track.

12. A method for determining geometrical parameters of a laser beam, comprising the steps:
focusing the laser beam into a processing region using an optical system,
positioning a reflector element with a first surface in a positioning region between the optical system and the processing region,
reflecting back of a portion of the focused laser beam on the first surface of the reflector element in the direction of the optical system,
output coupling a portion of the back-reflected beam portion,
determining at least one geometric parameter from the output coupled beam portion using a beam diagnostic device,
wherein the first surface of the reflector element is curved, and
wherein the reflector element is positioned in a positioning region, in which a mean curvature of a wave front of the focused laser beam that is focused by the optical system is equal to a curvature of the first surface of the reflector element.

13. The method according to claim 12, wherein the first surface of the reflector element is adjusted concentrically to the wave front of the focused laser.

14. The method according to claim 12, wherein a center of curvature of the first surface of the reflector element is set to a target position of the laser beam focus of the focused laser beam.

15. A method according to claim 12, wherein the step of determining the at least one geometric parameter from the output coupled beam portion comprises the following method steps:
focusing at least a partial region of the output coupled beam portion onto a spatially resolving sensor,
recording intensity data provided by the spatially resolving sensor, and
determining at least one geometric parameter from the recorded intensity data of the spatially resolving sensor.

16. The method according to claim 15, wherein an axial distance between the spatially resolving sensor and a position of an image of the laser beam focus is varied.

17. The method according to claim 15, wherein the determining of the at least one geometric parameter of the laser beam comprises determining at least one of the variables selected from the group of variables consisting of: a diameter of the laser beam, a focus diameter of the laser beam, a lateral position of the laser beam in a processing region, an axial focus position, an intensity distribution of the laser beam, a beam profile of the laser beam, a wave front of the laser beam, a laser beam path velocity, and seam energy of a processing track.

* * * * *